United States Patent [19]

Baker

[11] Patent Number: 5,734,130
[45] Date of Patent: Mar. 31, 1998

[54] DIGITIZING APPARATUS HAVING ARRAY OF HALL EFFECT SENSORS

[75] Inventor: Robert Grover Baker, Delray Beach, Fla.

[73] Assignee: International Business Machines Corporation, Armonk, N.Y.

[21] Appl. No.: 511,180

[22] Filed: Aug. 4, 1995

Related U.S. Application Data

[63] Continuation of Ser. No. 95,629, Jul. 21, 1993.

[51] Int. Cl.$^6$ .................................................. G08C 21/00
[52] U.S. Cl. ................................................................. 178/18
[58] Field of Search ........................ 178/18–20; 345/173, 345/174, 156, 179, 180; 329/212

*Primary Examiner*—Curtis Kuntz
*Assistant Examiner*—Paul Loomis
*Attorney, Agent, or Firm*—Daniel E. McConnell

[57] ABSTRACT

Digitizing apparatus comprises an array of Hall effect elements. The array includes conditioning circuitry and scanning circuitry for sensing the conditions of all Hall effect elements and determining which elements have been actuated by a user manipulated magnetic actuator. The apparatus inputs digital signals into a computer, the signals indicating relative positions of actuated Hall effect elements.

2 Claims, 3 Drawing Sheets

HEE →  ▬  ▬  ▬

DIGITIZING APPARATUS HAVING ARRAY OF HALL EFFECT SENSORS

This application is a continuing application based upon co-pending application Ser. No. 08/095,629 filed 21 Jul. 1993 under the same title, the priority of which is claimed.

RELATED APPLICATION

Application Ser. No. 08/095,626, filed on even date herewith, by Robert G. Baker, for "LIQUID CRYSTAL DISPLAY INTEGRATED WITH HALL EFFECT POINTING DEVICE", and assigned to the assignee of this application.

BACKGROUND OF THE INVENTION

1. Field of the Invention

This invention relates to improvements in digitizing apparatus for entering information into data processing apparatus such as personal computers. More particularly, the invention relates to improved digitizing apparatus having an array or grid of Hall effect sensors that are actuated by a magnetic actuator.

2. Description of Related Art

There are many commercially-available forms of digitizing devices designed for use with personal computers, to perform functions such as controlling a cursor or inputting data for computer aided design. In general, such devices comprise a movable actuator and a motion or position sensor that converts the movement or position of the actuator into electrical signals. These signals are digitized and transmitted into a computer where software is executed to interpret the signals and perform some sort of function, such as moving a screen cursor or drawing a line on a display screen. The digitizing devices are called various names including mice, track balls, digitizers, etc.

Many prior art digitizing devices have minor drawbacks. For instance, mice and track balls have rotatable balls that pick up dirt and grime and must be cleaned from time to time. Other devices have moving parts that are subject to wear and deterioration. Some devices employ a tethered stylus in which the tethering cable interferes with free movement of the stylus. As will be apparent from the detailed description below, the invention includes an untethered stylus and no moving parts that are subject to wear.

Also, as apparent from the description below, the invention includes an array of Hall effect elements. A Hall effect element is a well known device whose operating characteristics have been described in numerous articles including: Trent Wood, "An introduction to the use of Hall effect devices", Measurement-Control Volume 21, May 1988, pages 109–111; Douglas White, "The Hall effect sensor: operation and application", Australian Electronics Engineering, April 1989, pages 84–88; R. S. Popovic, "Hall-effect devices", Sensors and Actuators, 17(1989), pages 39–53; and S. Kordic, "Integrated Silicon Magnetic field sensors", Sensors and Actuators, 10(1986), pages 347–378. The latter two articles describe how Hall effect devices can be made by integrated circuit techniques. While these articles describe many diverse applications, most if not all involve the use of a single Hall effect device primarily designed to sense the proximity of a magnet having the proper orientation and polarity. None disclose the use of an array of Hall effect devices integrated into a digitizer array in the manner of the invention.

U.S. Pat. No. 4,695,680—Kable and U.S. Pat. No. 5,061,828—Purcell each disclose the use of a Hall effect sensor in a digitizer stylus, but the sensor is not used with other sensors to form an array, in the manner of the invention.

SUMMARY OF THE INVENTION

One of the objects of the invention is to provide improved digitizing apparatus having an array of Hall effect elements for sensing the position of a magnetic actuator.

Another object of the invention is to provide a digitizer comprising an array of Hall effect sensors which have no moving parts that are subject to wear and tear.

A further object of the invention is to provide a digitizer having Hall effect elements that are actuated by a magnetic actuator that requires no tether for inputting information into a data processing system.

Briefly, in accordance with the invention, a digitizer comprises an array of Hall effect elements located in a flat plane. The array includes conditioning circuitry and scanning circuitry for sensing the conditions of all elements and determining which elements have been actuated by a user manipulated magnetic actuator.

BRIEF DESCRIPTION OF THE DRAWINGS

Other objects and advantages of the invention will be apparent from the following description taken in connection with the accompanying drawings wherein.

DESCRIPTION OF ILLUSTRATIVE EMBODIMENT

Figure 1:
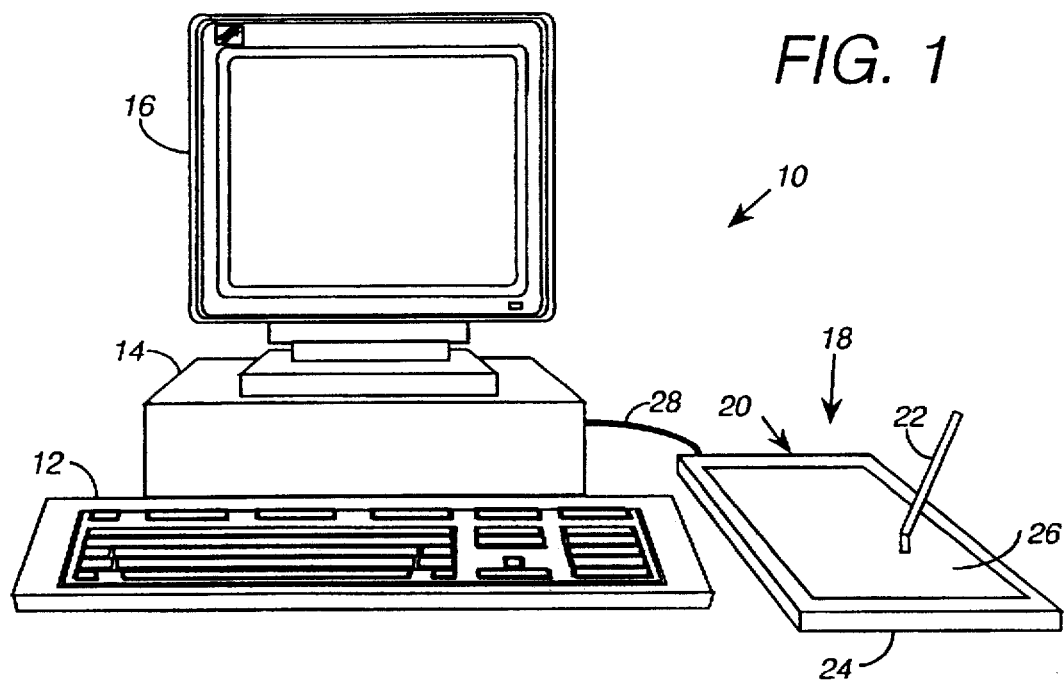
FIG. 1 is a pictorial representation of a data processing system embodying the invention.
Figure 2:
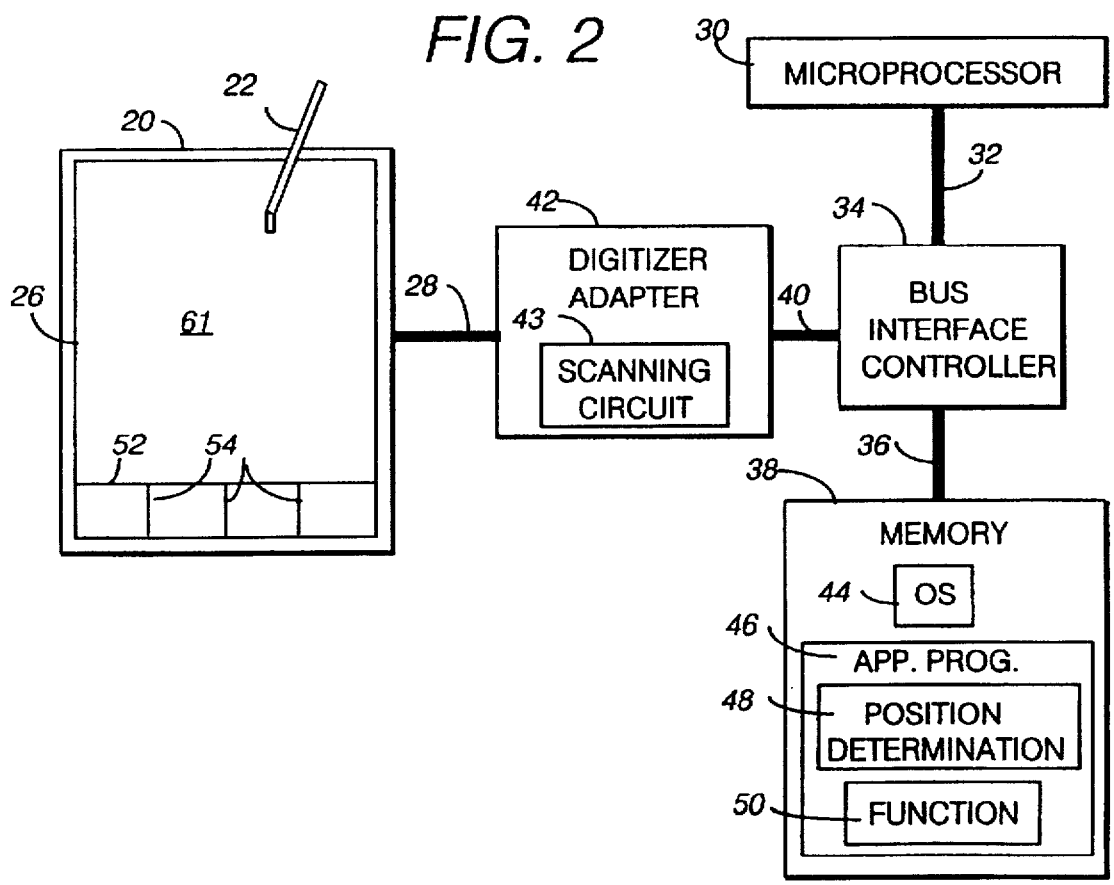
FIG. 2 is a block diagram of a data processing system embodying the invention.

Referring now to the drawings, and first to FIGS. 1 and 2, a data processing system (DPS) 10 includes a standard keyboard 12, system unit 14, and display 16 forming a conventional personal computer. Coupled to system unit 14 is digitizing apparatus 18 that comprises a digitizer tablet 20 and a magnetic actuator in the form of a cylindrical stylus 22. Tablet 20 comprises a housing 24 and a digitizer pad 26 containing an array or grid of Hall effect elements (HEEs) described below with primary reference to FIG. 4. A flexible cable 28 connects circuits within tablet 20 to circuits within system unit 14 and allows the tablet to be positioned, as desired, by the user. Tablet 20 is primarily designed for use on a desktop so that digitizer pad 26 presents a flat, upwardly facing, horizontal work surface relative to which the user can manipulate stylus 26 and input information into DPS 10.

DPS 10 comprises a microprocessor 30 connected by a local bus 32 to a bus interface controller 34. Controller 34 is connected by memory bus 36 to a memory which stores programs being executed by microprocessor 30. Controller 34 is also connected to an expansion or I/O bus 40 and functions as both a memory controller and a bus controller. The programs include an operating system (OS) 44 and a digitizer application program 46 that executes under control of the operating system. Program 46 includes a routine 48 for determining the position of actuator 22 and a routine 50 that interprets the position and performs some function dependent upon such position. A common function might be to highlight pixels on display 16 corresponding to the position of stylus 22 as it is moved over the surface of pad 56, and provide the user with the perception that the user is "writing" on the display screen.

A digitizer adapter 42 is connected to bus 40 and includes a scanning circuit 43 connected by cable 28 to digitizer pad 26. Pad 26 may include an overlay 61 having guide lines 52 and 54 that divide the pad surface into a work area at the top of the pad as viewed in FIG. 2, and a plurality of accessory "buttons" at the bottom. The accessory buttons may be further identified by legends (not shown) indicating the respective button functions, e.g., "enter", "draw line", etc. Quite obviously, the number of "buttons" and layout of overlay 61 depend upon the particular application program and what functions correspond to the positions of the pad actuated by stylus 22.

Figure 3:
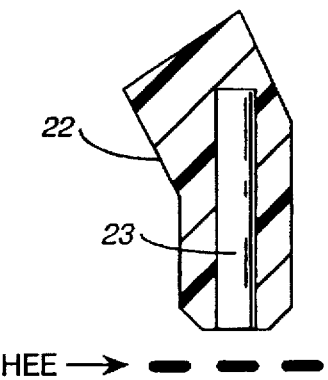
FIG. 3 is an enlarged sectional view through the tip of the stylus shown in FIGS. 1 and 2.

With reference to FIG. 3, stylus 22 is elongated and has a tip that is angularly offset from the remainder of the stylus, the tip having embedded therein a bar magnet 23. The angle of the offset facilitates the user manipulating the magnet so as to maintain the magnet perpendicular to the plane of the Hall effect elements (HEE). Magnet 23 generates magnetic flux lines. When the flux is perpendicular to a current conducting HEE and of the proper polarity and flux density, a voltage is produced across the HEE by the well known Hall effect, in a manner described in more detail hereinafter. The magnet thus acts as an actuator allowing the HEEs to detect the position thereof in accordance with which ones of the HEEs produce the Hall effect. The shape of the magnet and the flux field therefrom can vary from a very narrow field which can actuate only one HEE at a time, or it can be wider so that plural HEEs are simultaneously actuated. In the latter case, position determination software 48 determines the position, for example, by choosing the HEE which is at the centroid of the HEEs that are actuated.

Figure 4:
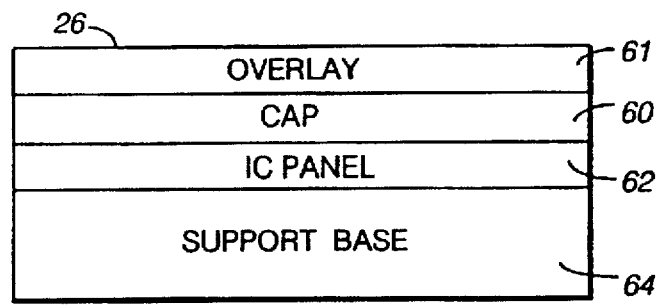
FIG. 4 is a schematic diagram illustrating the layered structure of the digitizer pad shown in FIGS. 1 and 2.

Referring to FIG. 4, digitizer pad 26 is constructed in layers and has a support base 64 upon which an integrated circuit (IC) substrate or panel 62 is mounted. The base provides the mechanical support for the chip and strain relief for electrical connections. Chip 62 is manufactured in accordance with standard integrated circuit manufacturing techniques and contains the Hall sensor array (HSA) described below with reference to FIGS. 6 and 7. A protective cap 60 covers the top of chip 62. An overlay 61 contains lines 52 and 54 and additional information indicating the functions of the accessory buttons, if included. The top of overlay 61 thus forms a work surface over which the stylus 22 can be moved by the user, to selectively actuate the HEEs beneath the work surface thereby allowing the position of the stylus to be detected and determined.

Figure 5:
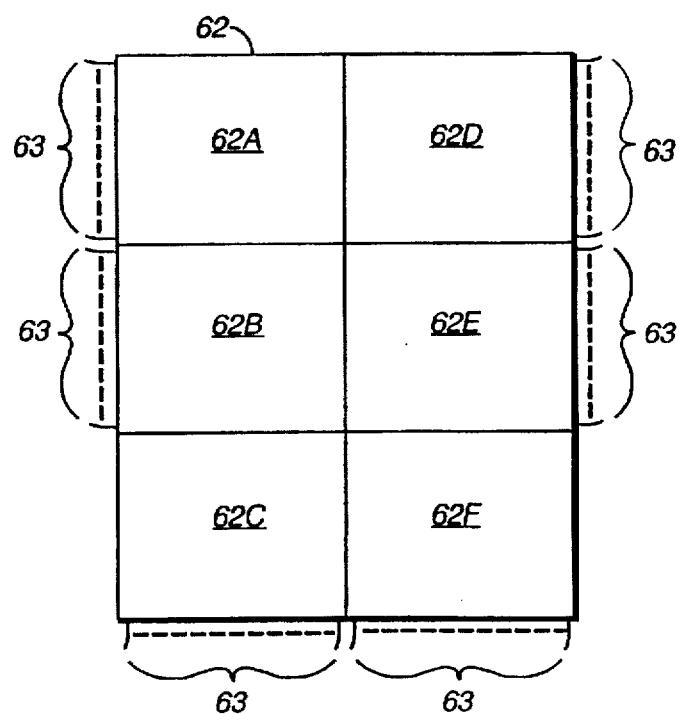
FIG. 5 is a plan view illustrating how several smaller chip panels are assembled to form a larger digitizer panel.

As shown in FIG. 5, a larger panel 62 may be formed from several smaller rectangular panels or chips 62A-D having abutting edges. A plurality of edge contacts 63 provide the means for connecting the row, column and sense lines to the scanning circuits. Contacts 63 are arranged along different edges to allow the chip 62 to be built up to the desired size. As shown, contacts 63 are arranged along the left edges of chips 62A and 62B, along the right edges of chips 62D and 62E, and along the bottom edges of chips 62C and 62F.

Figure 6:
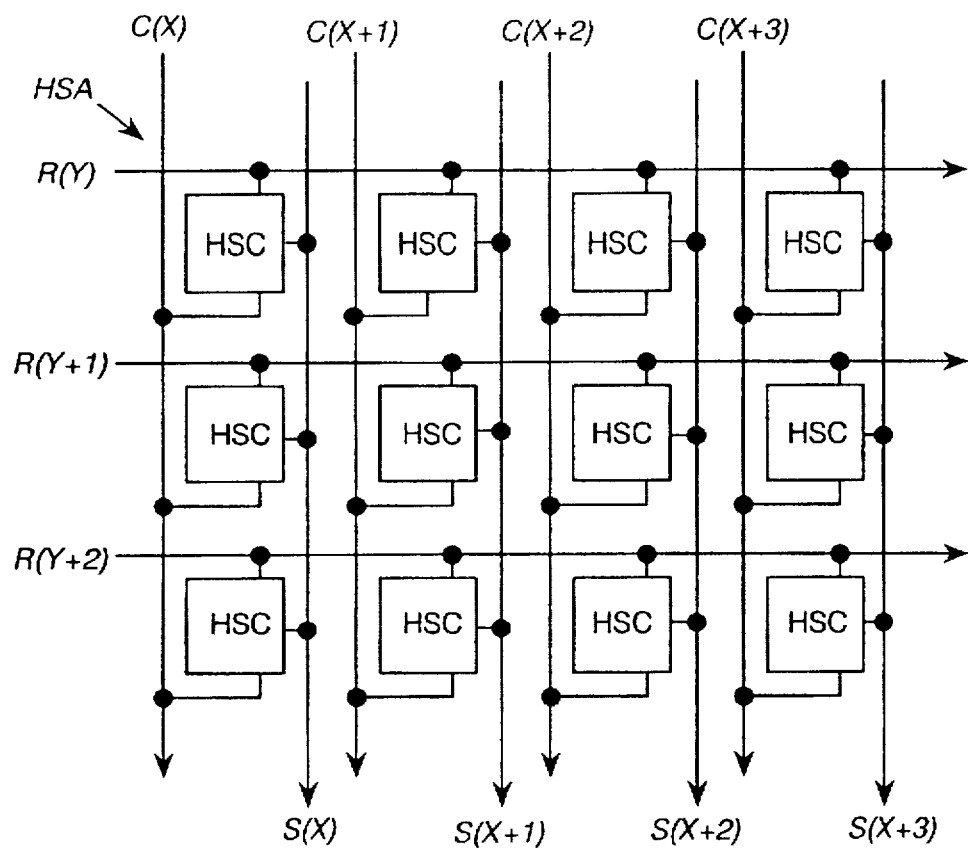
FIG. 6 is a an enlarged schematic plan view illustrating the digitizer pad Hall sensor array.
Figure 7:
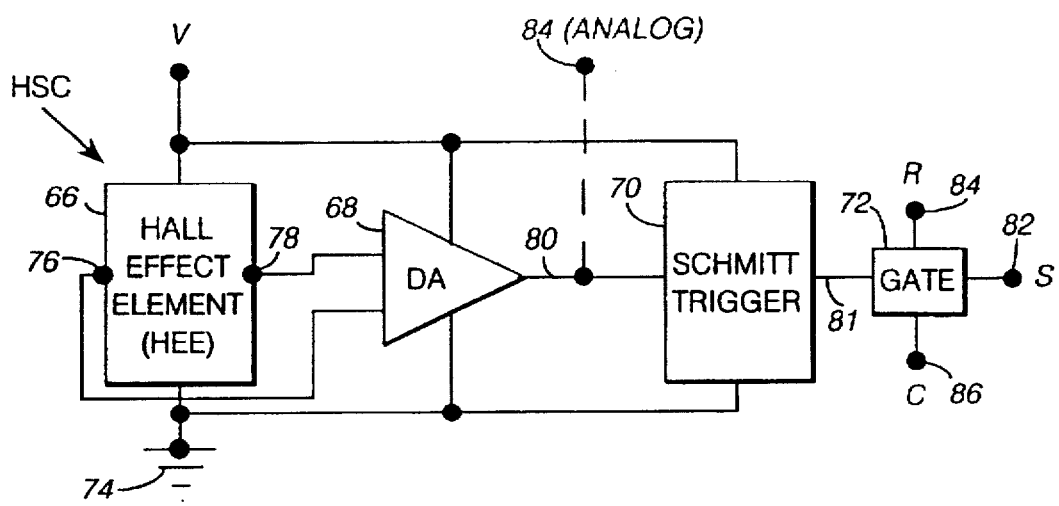
FIG. 7 is a schematic view of a single Hall sensor cell included in the array shown in FIG. 5.

Referring to FIGS. 6 and 7, the HSA contains an array or grid of Hall sensor cells (HSC). Each HSC comprises a HEE 66, a differential amplifier (DA) 68, a Schmitt trigger 70, and a gate 72. HEE 66 is made of semiconductor material, such as silicon, and has a flat rectangular shape. A HEE is actuated in conventional fashion by applying power to the longitudinal ends of the element so that current flows longitudinally through the element. The longitudinal ends of HEE are respectively connected to a regulated voltage source V and to a ground 74. When current flows longitudinally through the HEE, a voltage differential is created across the element at outputs 76 and 78, when a magnetic flux of proper polarity passes perpendicularly through the plane of the element. The magnitude of the voltage created is proportional to the flux density of the vertical component of the field.

DA 68 and Schmitt trigger 70 are also connected in parallel to voltage source V and ground 74. DA 68 amplifies the Hall effect voltage output of HEE to produce an amplified output on line 80 which is proportional to the flux density passing through HEE. Trigger 70, which is normally "off", triggers or switches "on" when the output of DA 68 reaches a predetermined threshold. Subsequently, when the output of DA 68 falls below a predetermined value, trigger 70 turns "off". Trigger 70 has an output 81 connected to a data input of gate 72. Gate 72 also has two gating inputs 84 and 86 for receiving a row signal R and a column signal C. When both signals R and C are active, gate 72 gates the input on line 81 to an output 82 and thus provides a digital output signal S indicating whether or not the cell HSC is being activated by stylus 22 positioned adjacent the cell. The output 80 of DA 68 may optionally be connected by a conductor at the dotted line (FIG. 7) to an analog output 84. The analog output provides a signal proportional to flux density being received by the HEE of the cell.

In the HSA, the cells HSC are arranged in an orthogonal grid with each cell being separated from adjacent cells by a space in which are contained the row, column and sense lines R(n), C(m), and S(m). These lines are selectively activated by scanning circuit 43 to repetitively scan each HSC in HSA. The particular "n" and "m" values being scanned at any particular instant define the x-y coordinates of the cell and thereby identify the location of a cell that is activated by the stylus. The rate at which the HSA is scanned ("scan rate") is sufficiently higher than the speed at which the user normally moves the stylus so that the progression of activation of adjacent cells is readily detected. The scanning can be done by turning on one row at a time and then turning on each column one at a time to thereby gate the output of each HSC in that row onto its respective output sense line. After all the columns for a given row have been examined, the scanning proceeds to the next row. Upon completion of the last row, the scanning then wraps around to the first row to repetitively continue the process.

It should be apparent to those skilled in the art that many changes can be made in the details and arrangements of steps and parts without departing from the scope of the invention as defined in the appended claims.

What is claimed is:

1. Digitizing apparatus comprising:
   a digitizer pad having
      a work surface,
      an array of Hall effect elements (HEEs) arranged beneath said work surface in an orthogonal grid of rows and columns with each HEE being identified by its row and column location in said grid, each HEE being operative to generate a Hall effect voltage when said each HEE is actuated by a magnetic field of a predetermined polarity and orientation and current is flowing through said each HEE, signal conditioning circuitry connected to each of said HEEs, said signal generating circuitry comprising:

a plurality of differential amplifiers, each amplifier being connected to a different HEE for receiving said Hall effect voltage therefrom, each differential amplifier producing an output signal proportional to said Hall effect voltage produced by said HEE connected thereto; and trigger means connected to each of said differential amplifiers for producing digital outputs indicating when said voltages from said differential amplifiers are above a predetermined magnitude;

said signal conditioning circuitry being connected to cause current to flow through each HEE and to provide output signals indicative of whether or not each HEE is being actuated and to generate digital signals indicating which ones of said HEEs have been actuated, scanning circuitry for scanning said array to detect said output signals from said signal conditioning circuitry, and a user manipulable magnetic actuator for selectively actuating said HEEs, said actuator emitting a magnetic field of predetermined polarity and being operative as said actuator is moved adjacent said work surface to actuate those ones of said HEEs immediately adjacent said actuator, whereby said scanning circuitry detects the position of said actuator relative to said digitizer pad as said actuator is moved relative to said pad.

2. Digitizing apparatus for inputting information into a computer, said digitizing apparatus comprising:

a digitizer pad having a work surface, an integrated circuit panel underlying said work surface and having a plurality of Hall effect elements (HEEs) arranged in an orthogonal grid of rows and columns predetermined array beneath said work surface, each of said plurality of HEEs defining an individual cell of predetermined finite width and length dimensions measured in a plane parallel to said work surface and being operative to generate a Hall effect voltage when said each HEE is actuated by a magnetic field of a predetermined polarity and orientation and current is flowing through said each HEE, each said cell being separated from any adjacent cell with each HEE being identified by its row and column location in said grid, signal conditioning circuitry connected to each of said HEEs, said signal conditioning circuitry being connected to cause current to flow through each HEE and provide output signals indicative of whether or not each HEE is being actuated, and scanning circuitry for scanning said array to detect said output signals from said signal conditioning circuitry and indicate the positions of which ones of said HEEs have been actuated;

said signal conditioning circuitry comprising a plurality of differential amplifiers, each amplifier being connected to a different HEE for receiving said Hall effect voltage therefrom, each differential amplifier producing an output signal proportional to said Hall effect voltage produced by said HEE connected thereto, and trigger means connected to each of said differential amplifiers for producing digital outputs indicating when said voltages from said differential amplifiers are above a predetermined magnitude;

a plurality of gates respectively connected to said trigger means, each gate having inputs for receiving row and column signals, each gate further having a sense line output, each gate being operative, in response to coincident row and column signals on said inputs, to gate said output of said trigger means connected thereto, onto said sense line output thereof; and a user manipulable magnetic actuator for selectively actuating said HEEs, said actuator emitting a magnetic field of predetermined polarity and being operative as said actuator is moved adjacent said work surface to actuate those ones of said HEEs immediately adjacent said actuator, whereby said scanning circuitry detects the position of said actuator relative to said digitizer pad as said actuator is moved relative to said pad.

* * * * *